(12) United States Patent
Kasahara et al.

(10) Patent No.: US 9,687,797 B2
(45) Date of Patent: Jun. 27, 2017

(54) KNEADING DEVICE

(71) Applicant: BRIDGESTONE CORPORATION, Tokyo (JP)

(72) Inventors: Naoki Kasahara, Kodaira (JP); Shinichi Sano, Hofu (JP)

(73) Assignee: BRIDGESTONE CORPORATION, Tokyo (JP)

( * ) Notice: Subject to any disclaimer, the term of this patent is extended or adjusted under 35 U.S.C. 154(b) by 102 days.

(21) Appl. No.: 14/443,172

(22) PCT Filed: Dec. 16, 2013

(86) PCT No.: PCT/JP2013/083678
§ 371 (c)(1),
(2) Date: May 15, 2015

(87) PCT Pub. No.: WO2014/103783
PCT Pub. Date: Jul. 3, 2014

(65) Prior Publication Data
US 2015/0298078 A1 Oct. 22, 2015

(30) Foreign Application Priority Data
Dec. 26, 2012 (JP) .................................. 2012-283487

(51) Int. Cl.
*B01F 7/00* (2006.01)
*B29B 7/18* (2006.01)

(52) U.S. Cl.
CPC ...... *B01F 7/00325* (2013.01); *B01F 7/00975* (2013.01); *B29B 7/186* (2013.01); *B01F 2215/0049* (2013.01)

(58) Field of Classification Search
CPC .......... B01F 2215/0049; B01F 7/00325; B01F 7/00975; B29B 7/186

(Continued)

(56) References Cited

U.S. PATENT DOCUMENTS

| 4,914,635 A * | 4/1990 | Nishigai ................. B29B 7/186 366/300 |
| 5,061,078 A | 10/1991 | Yada |
| 5,947,593 A | 9/1999 | Inoue et al. |
| 6,409,373 B1 | 6/2002 | Tanaka et al. |
| 7,556,420 B2 * | 7/2009 | Limper .................. B29B 7/186 366/300 |

(Continued)

FOREIGN PATENT DOCUMENTS

| CN | 1190054 A | 8/1998 |
| CN | 1265936 A | 9/2000 |

(Continued)

OTHER PUBLICATIONS

Feb. 18, 2014 International Search Report issued in International Patent Application No. PCT/JP2013/083678.

(Continued)

*Primary Examiner* — Tony G Soohoo
(74) *Attorney, Agent, or Firm* — Oliff PLC (57) ABSTRACT

A kneading device uniformly kneads materials to be kneaded while efficiently and quickly kneading the materials to be kneaded. A kneading device includes a kneading chamber accommodating materials to be kneaded and a pair of rotors. The pair of rotors is rotated in the kneading chamber and kneads the materials to be kneaded by a plurality of kneading blades. The plurality of kneading blades in each rotor is composed only of inclined blades inclined to the same direction in a rotational direction of the rotor with respect to an axial direction of the rotor when the rotor is developed into a planar state. The rotor has bent blades which are bent at bent portions to change tilt angles with respect to the axial direction of the rotor in the plurality of kneading blades.

6 Claims, 3 Drawing Sheets

(58) Field of Classification Search
USPC .................................. 366/97, 71, 72, 73, 74
See application file for complete search history.

(56) References Cited

U.S. PATENT DOCUMENTS

| | | | | |
|---|---|---|---|---|
| 2001/0050880 | A1* | 12/2001 | Regalia | ................... B29B 7/186 |
| | | | | 366/84 |
| 2002/0163852 | A1 | 11/2002 | Valsamis et al. | |
| 2006/0098527 | A1* | 5/2006 | Limper | ................... B01F 7/041 |
| | | | | 366/97 |
| 2011/0222364 | A1* | 9/2011 | Yoshida | ................... B29B 7/246 |
| | | | | 366/98 |
| 2014/0098626 | A1 | 4/2014 | Ikeya et al. | |

FOREIGN PATENT DOCUMENTS

| | | |
|---|---|---|
| EP | 1033217 A2 | 9/2000 |
| JP | 52-126462 A | 10/1977 |
| JP | 06-31725 A | 2/1994 |
| JP | H11-188249 A | 7/1999 |
| JP | H11-333831 A | 12/1999 |
| JP | 2000-225614 A | 8/2000 |
| JP | 2000-246731 A | 9/2000 |
| JP | 2001-009830 A | 1/2001 |
| JP | 2004-530546 A | 10/2004 |
| JP | 2006-218691 A | 8/2006 |
| JP | 2006-341489 A | 12/2006 |
| JP | 2007-130952 A | 5/2007 |
| JP | 2010-162511 A | 7/2010 |
| WO | 2012/014097 A1 | 2/2012 |
| WO | 2012/165469 A1 | 12/2012 |

OTHER PUBLICATIONS

Jun. 22, 2016 Extended Search Report issued in European Patent Application No. 13866886.8.

* cited by examiner

KNEADING DEVICE

TECHNICAL FIELD

The present invention relates to a kneading device for kneading materials to be kneaded in a kneading chamber by a rotor.

BACKGROUND ART

A kneading device has been used for kneading materials to be kneaded such as rubber and plastic. The kneading device generally includes a pair of rotors rotated in a kneading chamber, and kneads the materials to be kneaded into a predetermined state by the pair of rotors. Regarding the rotor of the kneading device, a flow of the materials to be kneaded around each rotor generated by rotation of the rotor is examined, and the shape of the rotor is set so that agitation, diffusion, and plasticization are balanced, for example. In connection with this, a batch-type kneading device in which a plurality of kneading blades is formed on the rotor has been known (see Patent Literature 1).

In the prior-art kneading device described in Patent Literature 1, the materials to be kneaded are kneaded by kneading blades composed of two long blades and two short blades while flowing. However, since the materials to be kneaded flow mainly around each rotor, it is difficult to knead the materials to be kneaded by effectively utilizing the entire space of the kneading chamber. Moreover, there is a concern that smooth flowing of the materials to be kneaded is disturbed by the kneading blades inclined in directions different from each other. In order to uniformly knead the materials to be kneaded by handling each of these problems, kneading time should be extended, but as the kneading time is extended, energy for kneading increases, which is a problem. Therefore, regarding the prior-art kneading device, there is a room for improvement in view of efficiency and quickness of kneading the materials to be kneaded.

Moreover, when rubber is kneaded with a filler (carbon, silica or the like), for example, the filler which is difficult to be mixed with rubber is necessary to be uniformly kneaded. In addition, in kneading requiring reaction between silica and its coupling agent, for example, it is preferable that kneading of the materials to be kneaded is completed before a temperature of the materials to be kneaded reaches a temperature (140° C., for example) at which a coupling reaction of the coupling agent starts. However, it is difficult for the prior-art kneading device to quickly knead the materials to be kneaded. Particularly in rubber for a tire, an added amount of silica has increased in recent years, and uniform kneading has become difficult.

CITATION LIST

Patent Literature

PTL 1: Japanese Patent Laid-Open No. 2010-162511

SUMMARY OF INVENTION

Technical Problem

The present invention is made in view of the above-described prior-art problems and has an object to uniformly knead materials to be kneaded while efficiently and quickly kneading the materials to be kneaded by a kneading device.

Solution to Problem

In a kneading device described in the claims, when a rotor is developed into a planar state, a plurality of kneading blades in each rotor is composed only of inclined blades inclined to the same direction in a rotational direction of the rotor with respect to an axial direction of the rotor. Moreover, the rotor has a bent blade which is bent at a bent portion to change its tilt angle with respect to the axial direction of the rotor in the plurality of kneading blades. Thus, kneading of materials to be kneaded is proceeded efficiently and quickly and the materials to be kneaded are uniformly kneaded.

In a kneading device described in the claims, since a bent blade is formed from one end portion to the other end portion of a rotor, flowing, agitation, and kneading of materials to be kneaded are reliably performed by using the entire rotor in an axial direction of the rotor.

In a kneading device described in the claims, a flow path of materials to be kneaded is adjusted by forming an end portion of a bent blade at a position away from an end portion of a rotor.

In a kneading device described in the claims, a rotor has a long bent blade which is a bent blade formed from one end portion to the other end portion of the rotor and a short bent blade which is a bent blade having a length of the rotor in an axial direction of the rotor smaller than that of the long bent blade. Thus, flowing, agitation, and kneading of materials to be kneaded are reliably performed by using the entire rotor in the axial direction thereof. Moreover, a flow path of the materials to be kneaded is adjusted.

In a kneading device described in the claims, a bent blade has a front inclined portion located on a front side in a rotational direction of a rotor with respect to a bent portion and a rear inclined portion located on a rear side in the rotational direction of the rotor with respect to the bent portion. Moreover, a tilt angle of the front inclined portion is larger than a tilt angle of the rear inclined portion. As a result, materials to be kneaded are evenly kneaded while flowing actively.

In a kneading device described in the claims, since a tilt angle of a rear inclined portion of a bent blade is 10.degree. or more and 30.degree. or less, unnecessary accumulation of materials to be kneaded is prevented, and a passage amount of materials to be kneaded in the rear inclined portion is ensured. Moreover, since the materials to be kneaded accumulate in the rear inclined portion, more reliable delivery of the materials to be kneaded between kneading blades is made possible.

In a kneading device described in the claims, since a tilt angle of a front inclined portion of a bent blade is 52.degree. or more and 72.degree. or less, materials to be kneaded are moved more reliably and quickly by the front inclined portion.

In a kneading device described in the claims, assuming that a length of a rotor in an axial direction of the rotor is M, a bent portion of a bent blade is formed at a position away from an end portion of the rotor on a front inclined portion side by a distance of M/4 or more and M/2 or less. As a result, movement of materials to be kneaded by the front inclined portion and kneading of the materials to be kneaded by a rear inclined portion are balanced.

In a kneading device described in the claims, assuming that a clearance between a rear inclined portion of a bent blade and an inner surface of a kneading chamber is D and a width of a tip end surface of the rear inclined portion is L, L/D is four or more and seven or less. As a result, materials to be kneaded are strongly kneaded and flowing of the materials to be kneaded in the kneading chamber is reliably promoted.

Advantageous Effects of Invention

According to the present invention, it is possible to uniformly knead the materials to be kneaded while efficiently and quickly kneading the materials to be kneaded by the kneading device.

DESCRIPTION OF EMBODIMENTS

An embodiment of a kneading device of the present invention will be described by referring to the attached drawings.

In this embodiment, a kneading device will be described by using a rubber kneading device kneading rubber as an example. Therefore, a main component of materials to be kneaded is rubber, and rubber is kneaded with a filler and an additive. Moreover, the kneading device of this embodiment is a non-meshed kneading device in which a pair of rotors is rotated so as not to be meshed with each other and is a sealed kneading device.

Figure 1:
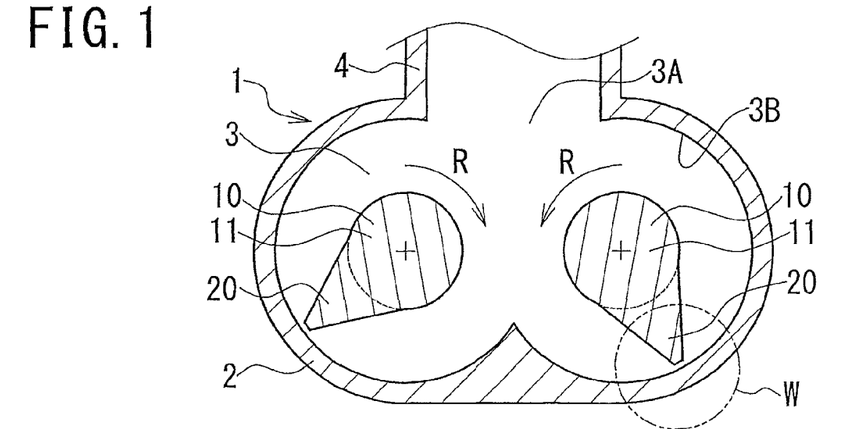
FIG. 1 is a sectional view of a kneading device of an embodiment of the present invention.

FIG. 1 is a sectional view of a kneading device 1 of this embodiment and illustrates an essential part of the kneading device 1 when seen from an axial direction of a rotor 10. Moreover, in FIG. 1, the kneading device 1 is illustrated in a section orthogonal to the axial direction of the rotor 10.

The kneading device 1 is provided with, as illustrated, a case 2, a kneading chamber 3 formed in the case 2, and a pair of rotors 10 accommodated in the kneading chamber 3.

The materials to be kneaded (not shown) are thrown into the kneading chamber 3 through an input tube 4 from a hopper (not shown) provided on an upper part of the kneading device 1 and are accommodated in the kneading chamber 3. The kneading chamber 3 is composed of two columnar spaces each accommodating the rotor 10 and is formed into a shape in which parts of the two spaces are crossed. An opening 3A of the kneading chamber 3 is to be closed by a floating weight (not shown) moving in the input tube 4, and the materials to be kneaded in the kneading chamber 3 are to be pressed by the floating weight.

The pair of rotors 10 is juxtaposed in the kneading chamber 3 in a state in which shaft centers are made in parallel and is rotatably supported by the case 2. Moreover, a gap is provided between the rotor 10 and an inner surface (inner wall) 3B of the kneading chamber 3. The kneading device 1 is provided with rotating means (not shown) rotating the pair of rotors 10 around the shaft centers of the pair of rotors 10, and the pair of rotors 10 is rotated by the rotating means made of a motor and the like in directions (rotational direction R) opposite to each other. At that time, the pair of rotors 10 is rotated not in contact with each other and not in contact with the inner surface 3B of the kneading chamber 3. The materials to be kneaded in the kneading chamber 3 are kneaded by the rotating pair of rotors 10. The materials to be kneaded after kneading are discharged from the kneading chamber 3 through an opening/closing type drop door (not shown) provided on a lower part of the case 2.

The rotor 10 has a columnar shaft portion 11 and a plurality of kneading blades 20 (only one kneading blade 20 is shown in FIG. 1) formed on an outer periphery of the shaft portion 11. The kneading blade 20 is a rib protruding outward in a radial direction of the rotor 10 and is formed on the entire rotor 10 in the axial direction thereof or a predetermined region of the rotor 10 in the axial direction thereof. Moreover, the kneading blade 20 extends while inclined in the axial direction of the rotor 10 and is formed spirally on an outer periphery of the rotor 10. The pair of rotors 10 is rotated in the kneading chamber 3 in a state in which the kneading blades 20 are not meshed with each other (not-in-contact state) and kneads the materials to be kneaded by the plurality of kneading blades 20. In addition, the state in which the kneading blades 20 are not meshed with each other is a state in which moving ranges of the kneading blades 20 of the pair of rotors 10 are not overlapped.

Figure 2:
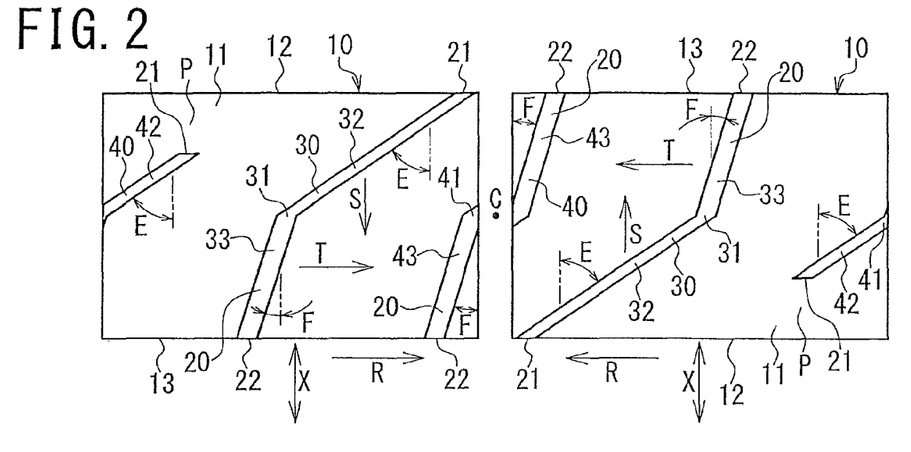
FIG. 2 is a plan view obtained by developing outer peripheries of a pair of rotors into a planar state.

FIG. 2 is a plan view obtained by developing outer peripheries of the pair of rotors 10 into the planar state and illustrates plan views of a circumference of each rotor 10 juxtaposed laterally. In the actual rotor 10, right and left edges of each plan view are connected.

As illustrated, when the rotor 10 is developed into the planar state around the shaft center, each part (the shaft portion 11, the kneading blade 20) on the outer periphery of the rotor 10 is shown on the same plane. Moreover, the pair of rotors 10 is arranged with directions changed each other by 180° around a center point C. With that, in a state illustrated in FIG. 2, the kneading blades 20 of the pair of rotors 10 are arranged point-symmetrically with respect to the center point C of the pair of rotors 10.

In this embodiment, the plurality of kneading blades 20 in each rotor 10 is composed only of inclined blades inclined to the same direction in the rotational direction R with respect to an axial direction X of the rotor 10, when each rotor 10 is developed into the planar state. That is, in each rotor 10, all the kneading blades 20 are formed spirally so as to twist to the same direction in the rotational direction R and are inclined to the same direction in the rotational direction R with respect to the axial direction X of the rotor 10. Moreover, the kneading blade 20 is inclined to a rear side in the rotational direction R of the rotor 10 from a start point 21 to an end point 22. Therefore, in each kneading blade 20, the start point 21 is a front end portion in the rotational direction R of the rotor 10, and the end point 22 is a rear end portion in the rotational direction R of the rotor 10. A plurality of start points 21 of each rotor 10 is located on the same side in the axial direction X of the rotor 10, and the start points 21 of the pair of rotors 10 are located on the opposite sides in the axial direction X of the rotor 10.

The rotor 10 has bent blades 30 and 40 bent at bent portions 31 and 41 respectively to change angles (tilt angles E and F) with respect to the axial direction X of the rotor 10 in the plurality of kneading blades 20. Here, the plurality of kneading blades 20 of the rotor 10 is composed only of the two bent blades 30 and 40 and is formed by being away by 180° in the rotational direction R of the rotor 10. The bent blades 30 and 40 are formed into bent shapes inclined with respect to the axial direction X of the rotor 10 and are bent once in the middle of the rotor 10 in the axial direction X thereof.

In addition, in the plan view of the rotor 10 in FIG. 2, the one continuous bent blade 40 is separated at the bent portion 41 with development of the rotor 10 and is illustrated on right and left edge sides. Moreover, the tilt angles E and F of the bent blades 30 and 40 are angles formed by the axial direction X of the rotor 10 and inclined directions of the bent blades 30 and 40, when the rotor 10 is developed into the planar state. The tilt angles E and F of the bent blades 30 and 40 form acute angles, and the tilt angle E on the start point 21 side is larger than the tilt angle F on the end point 22 side.

The one bent blade 30 is a long bent blade (main bent blade) formed from one end portion 12 to the other end portion 13 in the axial direction X of the rotor 10. Both end portions (start point 21, end point 22) of the long bent blade 30 are located on the end portions 12 and 13 of the rotor 10. The other bent blade 40 is a short bent blade (sub bent blade) having a length of the rotor 10 in the axial direction X thereof smaller than that of the long bent blade 30. An end portion (both end portions or either one of the end portions) of the short bent blade 40 is formed at a position away from the end portions 12 and 13 of the rotor 10 and is located between the one end portion 12 and the other end portion 13 of the rotor 10. Here, one end portion (start point 21) of the short bent blade 40 located on a front side in the rotational direction R of the rotor 10 is formed at a position away from the one end portion 12 of the rotor 10. As a result, on the outer periphery of the rotor 10, a passage portion P through which the materials to be kneaded pass is provided between the one end portion 12 of the rotor 10 and the one end portion of the short bent blade 40.

The bent blades 30 and 40 of this embodiment have the one bent portions 31 and 41 formed in the middle of the rotor 10 in the axial direction X thereof and two inclined portions 32, 33 and 42, 43 formed on both sides of the bent portions 31 and 41, respectively. In the bent blades 30 and 40, the tilt angles E and F of the two inclined portions 32, 33 and 42, 43 are different from each other and are discontinuously changed at the bent portions 31 and 41 as borders, respectively. The one inclined portions 32 and 42 are front inclined portions located on the front side in the rotational direction R of the rotor 10 with respect to the bent portions 31 and 41, and the other inclined portions 33 and 43 are rear inclined portions located on the rear side in the rotational direction R of the rotor 10 with respect to the bent portions 31 and 41, respectively. The tilt angle E of the front inclined portions 32 and 42 is larger than the tilt angle F of the rear inclined portions 33 and 43.

When the materials to be kneaded are kneaded, the pair of rotors 10 is rotated in the directions (rotational direction R) opposite to each other in the kneading chamber 3 accommodating the materials to be kneaded. With that, in a portion (front inclined portions 32 and 42) where the tilt angle E of the bent blades 30 and 40 is relatively large, the materials to be kneaded are pushed in the axial direction X of the rotor 10 mainly by the bent blades 30 and 40, and flowing of the materials to be kneaded around the rotor 10 is promoted. The materials to be kneaded are agitated and kneaded while moving quickly in a moving direction S along the bent blades 30 and 40.

In a portion (rear inclined portions 33 and 43) where the tilt angle F of the bent blades 30 and 40 is relatively small, the materials to be kneaded pass mainly between the bent blades 30 and 40 and the inner surface 3B of the kneading chamber 3 so as to be ground. As a result, diffusion and plasticization of the materials to be kneaded are promoted, and the materials to be kneaded are strongly kneaded. After that, the materials to be kneaded are delivered to the bent blades 30 and 40 on the rear side in the rotational direction R or are fed to the opposed rotor 10 from the bent blades 30 and 40. The materials to be kneaded are kneaded again by the bent blades 30 and 40 at delivery destinations. Moreover, after the materials to be kneaded are fed in a fed-in direction T and are moved from the one rotor 10 to the other rotor 10, the materials to be kneaded are kneaded again by the bent blades 30 and 40 of the other rotor 10.

As described above, by means of the bent blades 30 and 40 of the pair of rotors 10, the materials to be kneaded flow around each rotor 10 and flow between the pair of rotors 10. The bent blades 30 and 40 promote flowing of the materials to be kneaded in the entire space of the kneading chamber 3. At that time, since the plurality of kneading blades 20 is composed only of the inclined blades inclined to the same direction, the materials to be kneaded flow smoothly in the kneading chamber 3 without stagnation. The materials to be kneaded are kneaded while flowing actively in a space in the kneading chamber 3 by flowing in the moving direction S and the fed-in direction T.

Specifically, by the front inclined portions 32 and 42 of the bent blades 30 and 40, the materials to be kneaded are moved in the moving direction S toward the rear inclined portions 33 and 43 of the bent blades 30 and 40. Subsequently, the materials to be kneaded pass between the rear inclined portions 33 and 43 and the inner surface 3B of the kneading chamber 3 and are fed in the fed-in direction T. Since there is the passage portion P in the rotor 10 at a fed-in destination, interference of feeding-in of the materials to be kneaded is suppressed. Thus, the materials to be kneaded are smoothly fed from the one rotor 10 to the other rotor 10, and are received reliably by the other rotor 10. The materials to be kneaded circulate between the pair of rotors 10 and are gradually kneaded by the plurality of kneading blades 20 of the rotor 10.

As described above, according to the kneading device 1 of this embodiment, kneading of the materials to be kneaded can be proceeded efficiently and quickly by effectively utilizing the entire space of the kneading chamber 3. Moreover, the materials to be kneaded can be kneaded uniformly in a short time. With that, while energy for kneading is reduced, uniformity of the materials to be kneaded can be heightened, and a quality of the materials to be kneaded can be improved. Even when an added amount of the filler is increased, since kneading of the materials to be kneaded can be proceeded quickly, the materials to be kneaded can be kneaded uniformly.

By means of the long bent blade 30 formed from the one end portion 12 to the other end portion 13 of the rotor 10, flowing, agitation, and kneading of the materials to be kneaded can be performed reliably by using the entire rotor 10 in the axial direction X thereof. Moreover, during kneading, the materials to be kneaded are moved by the front inclined portions 32 and 42 in the moving direction S and then, are fed in the fed-in direction T by the rear inclined portions 33 and 43. As a result, the materials to be kneaded can be evenly kneaded while flowing actively.

Here, if the tilt angle E of the front inclined portions 32 and 42 of the bent blades 30 and 40 is smaller than 52°, there is a concern that the materials to be kneaded cannot be moved in the moving direction S easily. Alternatively, if the tilt angle E is larger than 72°, there is a concern that quick movement of the materials to be kneaded is affected. Therefore, the tilt angle E is preferably 52° or more and 72° or less. By setting as above, the materials to be kneaded can be moved reliably and quickly in the moving direction S by the front inclined portions 32 and 42. Here, the tilt angle E is 62°.

If the tilt angle F of the rear inclined portions 33 and 43 of the bent blades 30 and 40 is smaller than 10°, there is a tendency that the materials to be kneaded cannot be moved along the rear inclined portions 33 and 43 easily. As a result, the materials to be kneaded can easily accumulate in the rear inclined portions 33 and 43, and there is a concern that movement of the materials to be kneaded from the front inclined portions 32 and 42 to the rear inclined portions 33 and 43 is affected. Alternatively, if the tilt angle F is larger than 30°, the materials to be kneaded can be moved easily along the rear inclined portions 33 and 43, and thus, there is a concern that a passage amount of the materials to be kneaded passing between the rear inclined portions 33 and 43 and the inner surface 3B of the kneading chamber 3 is affected. Therefore, the tilt angle F is preferably 10° or more and 30° or less. As a result, unnecessary accumulation of the materials to be kneaded can be prevented, and the passage amount of the materials to be kneaded in the rear inclined portions 33 and 43 can be ensured. Since the material to be kneaded accumulates in the rear inclined portions 33 and 43, more reliable delivery of the materials to be kneaded between the kneading blades 20 is made possible. Here, the tilt angle F is 21°.

Subsequently, the positions of the bent portions 31 and 41 of the bent blades 30 and 40 and the like will be described.

Figure 3A:
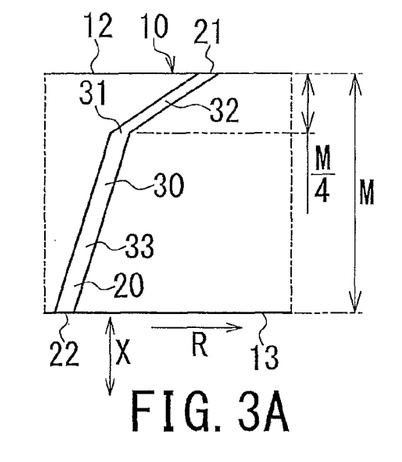
FIGS. 3A and 3B are plan views illustrating a part of one of the rotors.
Figure 3B:
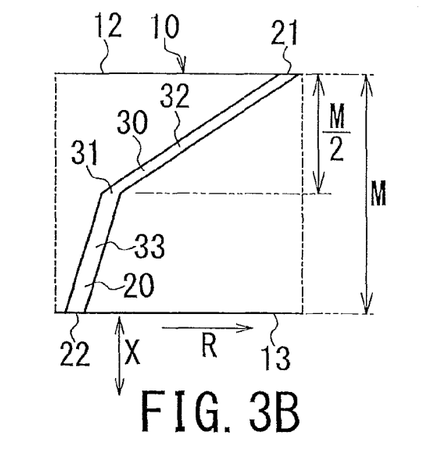

FIGS. 3A and 3B are plan views illustrating a part of one of the rotors 10 (left in FIG. 2), and only one bent blade (long bent blade 30) is illustrated. Moreover, FIGS. 3A and 3B illustrate the long bent blade 30 with the position of the bent portion 31 changed.

As illustrated, assuming that the length of the rotor 10 in the axial direction X thereof is M, the bent portion 31 is preferably formed at a position away from the end portion 12 of the rotor 10 on the front inclined portion 32 side by a distance of M/4 or more and M/2 or less in the axial direction X of the rotor 10.

That is, in the axial direction X of the rotor 10, a separation distance between the end portion 12 and the bent portion 31 (a length of the front inclined portion 32, here) is preferably M/4 or more and M/2 or less. If the separation distance is shorter than M/4, since the front inclined portion 32 becomes shorter, there is a concern that the materials to be kneaded cannot be moved easily in the moving direction S. Moreover, if the separation distance is longer than M/2, since the rear inclined portion 33 becomes shorter, there is a concern that kneading of the materials to be kneaded by the rear inclined portion 33 becomes less. On the contrary, by forming the bent portion 31 at the above-described preferable position, movement of the materials to be kneaded by the front inclined portion 32 and kneading of the materials to be kneaded by the rear inclined portion 33 can be balanced.

Figure 4:
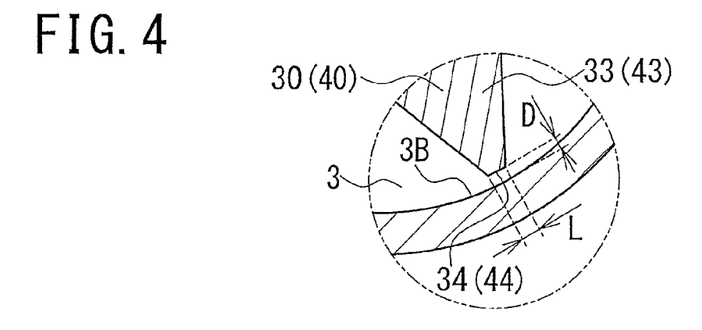
FIG. 4 is a sectional view enlarging a W part in FIG. 1.

FIG. 4 is a sectional view enlarging a W part in FIG. 1 and illustrates peripheries of tip end surfaces 34 and 44 of the bent blades 30 and 40.

As illustrated, assume that a clearance (dimension of a gap) between the rear inclined portions 33 and 43 of the bent blades 30 and 40 and the inner surface 3B of the kneading chamber 3 is D, and a width (land width) of the tip end surfaces 34 and 44 of the rear inclined portions 33 and 43 is L. As described above, the materials to be kneaded are kneaded so as to be ground when they pass between the rear inclined portions 33 and 43 (tip end surfaces 34 and 44) and the inner surface 3B of the kneading chamber 3. If a ratio of L to D (L/D) is smaller than four, with a decrease of the width L of the tip end surfaces 34 and 44, there is a concern that grinding of the materials to be kneaded becomes less. On the contrary, even if L/D is made larger than seven, an effect of grinding the materials to be kneaded does not change, and there is a concern that the materials to be kneaded cannot pass between the rear inclined portions 33 and 43 and the inner surface 3B of the kneading chamber 3 easily.

Therefore, L/D is preferably four or more and seven or less. As a result, the materials to be kneaded can be strongly kneaded between the rear inclined portions 33 and 43 and the inner surface 3B of the kneading chamber 3. At the same time, since the materials to be kneaded smoothly pass between the rear inclined portions 33 and 43 and the inner surface 3B of the kneading chamber 3, flowing of the materials to be kneaded in the kneading chamber 3 can be reliably promoted. If rubber and the filler are to be kneaded, their kneading can be promoted, and the filler can be uniformly diffused in the rubber. Here, L/D is six.

In addition, the tilt angles E and F (see FIG. 2) of the bent blades 30 and 40 may be the same between the long bent blade 30 and the short bent blade 40 or may be different from each other between the long bent blade 30 and the short bent blade 40. The bent portion 31 of the long bent blade 30 and the bent portion 41 of the short bent blade 40 may be formed at the same position in the axial direction X of the rotor 10 or may be formed at different positions in the axial direction X of the rotor 10. Moreover, only one end portion of the short bent blade 40 may be formed at a position away from the end portions 12 and 13 of the rotor 10 or the both end portions of the short bent blade 40 may be formed at positions away from the end portions 12 and 13.

Figure 5A:
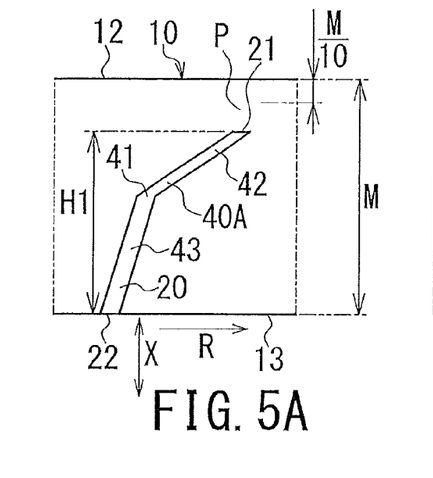
FIGS. 5A and 5B are plan views illustrating two types of short bent blades.
Figure 5B:
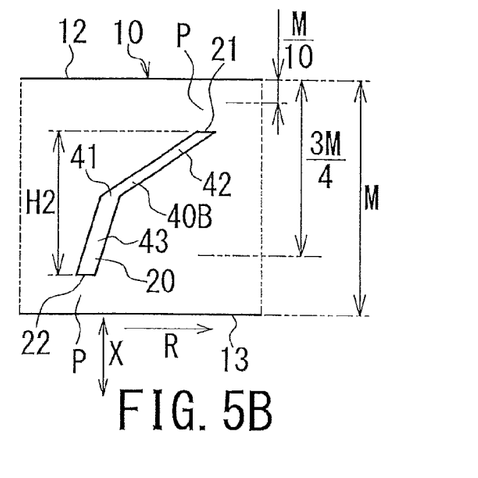

FIGS. 5A and 5B are plan views illustrating two types of short bent blades 40 (first short bent blade 40A, second short bent blade 40B).

In the first short bent blade 40A illustrated in FIG. 5A, one end portion (start point 21) located on the front side in the rotational direction R of the rotor 10 is formed at a position away from the one end portion 12 (end portion on the front inclined portion 42 side) of the rotor 10. The other end portion (end point 22) located on the rear side in the rotational direction R of the rotor 10 is formed on the other end portion 13 (end portion on the rear inclined portion 43 side) of the rotor 10. Here, the one end portion of the first short bent blade 40A is formed at a position away from the one end portion 12 of the rotor 10 by a distance of M/10 or more in the axial direction X of the rotor 10. Reference character M denotes the length of the rotor 10 in the axial direction X. Moreover, a length H1 of the first short bent blade 40A in the axial direction X of the rotor 10 is M/2 or more.

In the second short bent blade 40B illustrated in FIG. 5B, the both end portions (start point 21, end point 22) are formed at positions away from the end portions 12 and 13 of the rotor 10. Here, one end portion of the second short bent blade 40B is formed at a position away from the one end portion 12 of the rotor 10 by a distance of M/10 or more in the axial direction X of the rotor 10. Moreover, the other end portion of the second short bent blade 40B is formed at a position away from the one end portion 12 of the rotor 10 by a distance of 3M/4 or more in the axial direction X of the rotor 10. A length H2 of the second short bent blade 40B in the axial direction X of the rotor 10 is M/2 or more.

As described above, by forming the end portions of the short bent blade 40 (40A, 40B) at positions away from the end portions 12 and 13 of the rotor 10, the passage portion P of the materials to be kneaded is provided in the rotor 10. By providing the passage portion P on the end portion of the short bent blade 40 (one of the end portions or the both end portions), a flow path of the materials to be kneaded can be adjusted. Moreover, feeding-in and flowing of the materials to be kneaded can be made smoothly by the passage portion P. In this embodiment, the one long bent blade 30 and the one first short bent blade 40A are formed on the rotor 10 (see FIG. 2), but the long bent blade 30, the first short bent blade 40A, and the second short bent blade 40B may be combined in another mode.

FIGS. 6A to 9B are plan views obtained by developing one of the rotors 10 into the planar state and each of them is a plan view of a circumference of the rotor 10.

As illustrated, the rotor 10 has at least one long bent blade 30 and is also composed of two or three bent blades 30, 40A, and 40B.

Figure 6A:
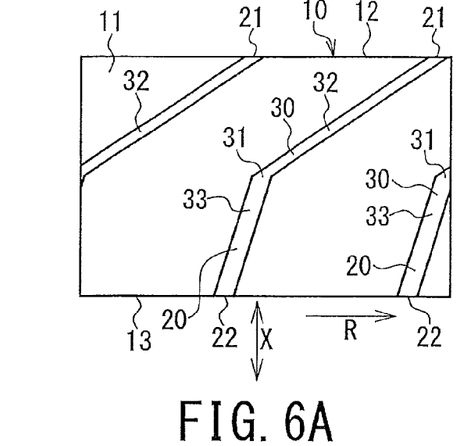
FIGS. 6A and 6B are plan views obtained by developing one of the rotors into a planar state.
Figure 6B:
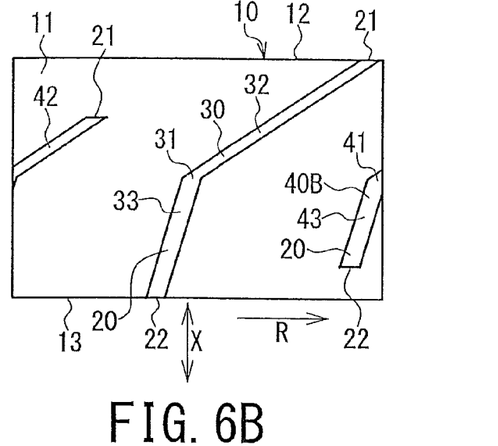

Specifically, the rotor 10 illustrated in FIG. 6A has two long bent blades 30. The rotor 10 illustrated in FIG. 6B has one long bent blade 30 and the one second short bent blade 40B.

Figure 7A:
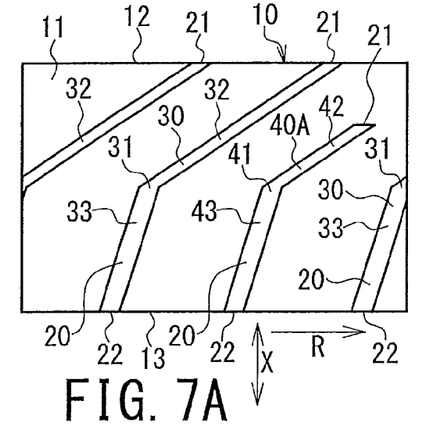
FIGS. 7A and 7B are plan views obtained by developing one of the rotors into the planar state.
Figure 7B:
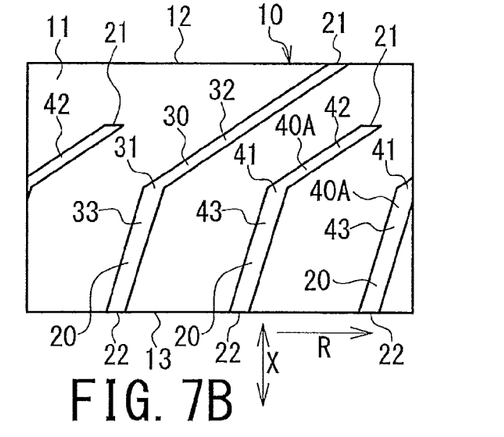

The rotor 10 illustrated in FIG. 7A has the two long bent blades 30 and the one first short blade 40A. The rotor 10 illustrated in FIG. 7B has one long bent blade 30 and two first short bent blades 40A.

Figure 8A:
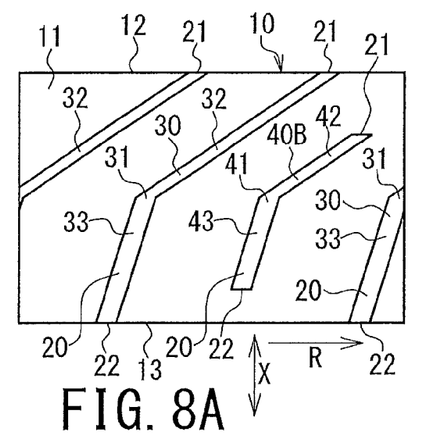
FIGS. 8A and 8B are plan views obtained by developing one of the rotors into the planar state.
Figure 8B:
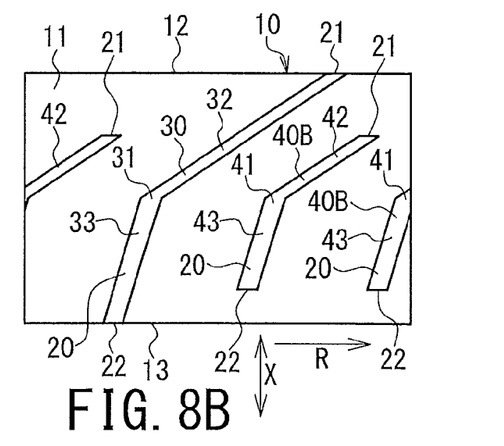

The rotor 10 illustrated in FIG. 8A has two long bent blades 30 and one second short bent blade 40B. The rotor 10 illustrated in FIG. 8B has one long bent blade 30 and the two second short bent blades 40B.

Figure 9A:
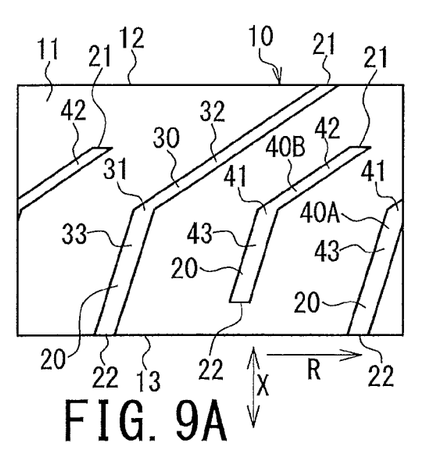
FIGS. 9A and 9B are plan views obtained by developing one of the rotors into the planar state.
Figure 9B:
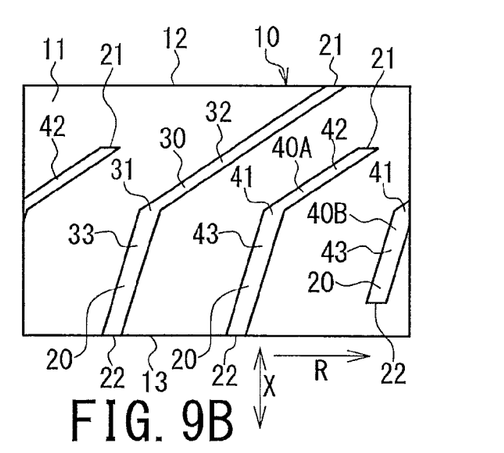

The rotor 10 illustrated in FIGS. 9A and 9B has one long bent blade 30, one first short bent blade 40A, and the one second short bent blade 40B. The three types of the bent blades 30, 40A, and 40B can be arranged in an arbitrary order in the rotational direction R of the rotor 10.

In addition, the rotor 10 may have an inclined blade which is not bent in addition to the bent blades 30 and 40 in the plurality of kneading blades 20. Moreover, four or more kneading blades 20 may be formed on the rotor 10. A plurality of bent portions 31 and 41 may be formed on the bent blades 30 and 40, and three or more inclined portions may be formed on the bent blades 30 and 40. In this case, the tilt angle of each inclined portion is made different from each other, and the tilt angle of the inclined portion is gradually reduced as it goes toward a rear in the rotational direction R of the rotor 10.

(Kneading Test of Materials to be Kneaded)

In order to confirm the effect of the present invention, the materials to be kneaded were kneaded by the kneading device 1 (see FIGS. 1 and 2) of this embodiment, and uniformity of the materials to be kneaded of an example was evaluated. Moreover, in order to make comparison with the example, the materials to be kneaded were kneaded by a prior-art kneading device with the kneading blade 20 of the rotor 10 different from that of this embodiment, and uniformity of the materials to be kneaded of the prior-art example was evaluated.

A mixing ratio of the materials to be kneaded is illustrated in Table 1.

TABLE 1

|  | PHR |
| --- | --- |
| NATURAL RUBBER | 10 |
| SYNTHETIC RUBBER | 90 |
| CARBON | 8 |
| SILICA | 72 |
| COUPLING AGENT | 5.7 |
| DRUG | 41.5 |

PHR in Table 1 is a part by weight of each mixed component to 100 weight of rubber component. In the example and the prior-art example, the materials to be kneaded with the same mixing ratio illustrated in Table 1 were kneaded. At that time, energy spent for kneading the materials to be kneaded was measured. Moreover, after kneading was completed, the materials to be kneaded were analyzed, and a silica aggregate area was acquired. By using the materials to be kneaded, a loss tangent (tan δ (60° C.)) of the materials to be kneaded at 60° C. was also measured.

A test result is shown in Table 2. Energy is shown by an index with the prior-art example at 100.

TABLE 2

| EVALUATION ITEM | UNIT | PRIOR-ART EXAMPLE | EXAMPLE |
| --- | --- | --- | --- |
| ENERGY | [—] | 100 | 88 |
| SILICA AGGREGATE AREA | [nm$^2$] | 3245 | 3065 |
| tan δ (60° C.) | [—] | 0.118 | 0.116 |

The energy of the example was reduced to 88 with respect to 100 in the prior-art example. Moreover, the silica aggregate area of the example was 3065 with respect to 3245 in the prior-art example, which was smaller than the prior-art example. Therefore, as compared with the prior-art example, in the example, the silica aggregate area (uniformity) was improved by approximately 5% with less energy by 12%. The tan δ (60° C.) of the example was 0.116 with respect to 0.118 in the prior-art example, which was smaller than the prior-art example. As a result, it was known that the materials to be kneaded of the example are kneaded more uniformly than the prior-art example.

REFERENCE SIGNS LIST

1; kneading device, 2; case, 3; kneading chamber, 3A; opening, 3B; inner surface, 4; input tube, 10; rotor, 11; shaft portion, 12, 13; end portion, 20; kneading blade, 21; start point, 22; end point, 30; long bent blade, 31; bent portion, 32; front inclined portion, 33; rear inclined portion, 34; tip end surface, 40; short bent blade, 41; bent portion, 42; front inclined portion, 43; rear inclined portion, 44; tip end surface, P; passage portion, R; rotational direction, S; moving direction, T; fed-in direction, X; axial direction

The invention claimed is:

1. A kneading device comprising:
   a kneading chamber configured for accommodating materials to be kneaded; and
   a pair of rotors configured for being rotated in the kneading chamber and kneading the materials to be kneaded by a plurality of kneading blades, wherein
   when each rotor is developed into a planar state, the plurality of kneading blades in each rotor is composed only of inclined blades inclined to the same direction in a rotational direction of the rotor with respect to a rotor rotation axis and wherein, in each rotor:

the rotor has a long bent blade and a short bent blade, as part of the inclined blades, which are bent at respective bent portions to change its respective tilt angle with respect to the rotor rotation axis in the plurality of kneading blades;

both end portions of the long bent blade are located on the end portions of the rotor;

an end portion of the short bent blade is formed at a position away from the end portions of the rotor; and a passage portion through which the materials to be kneaded can pass is provided between the one end portion of the rotor and the one end portion of the short bent blade.

2. The kneading device according to claim 1, wherein, in each rotor:

each bent blade has a front inclined portion located on a front side in the rotational direction of the rotor with respect to the respective bent portion and a rear inclined portion located on a rear side in the rotational direction of the rotor with respect to the respective bent portion; and a tilt angle of the front inclined portion is larger than a tilt angle of the rear inclined portion.

3. The kneading device according to claim 2, wherein, in each rotor:

the tilt angle of the rear inclined portion of each bent blade is 10° or more and 30° or less.

4. The kneading device according to claim 2, wherein, in each rotor:

the tilt angle of the front inclined portion of each bent blade is 52° or more and 72° or less.

5. The kneading device according to claim 2, wherein, in each rotor:

assuming that a length of the rotor in the rotor rotation axis is M, the bent portion of the long bent blade is formed at a position away from an end portion of the rotor on the front inclined portion side by a distance of M/4 or more and M/2 or less.

6. The kneading device according to claim 2, wherein, in each rotor:

assuming that a clearance between the rear inclined portion of each bent blade and an inner surface of the kneading chamber is D and a width of a tip end surface of each rear inclined portion is L, L/D is four or more and seven or less.

* * * * *